United States Patent [19]

Wagner et al.

[11] Patent Number: 4,937,361

[45] Date of Patent: Jun. 26, 1990

[54] GLYCIDYL AZIDE POLYMER AND METHOD OF PREPARATION

[75] Inventors: Ross I. Wagner, Woodland Hills; Edgar R. Wilson, Simi Valley; Louis R. Grant, Los Angeles; Joseph E. Flanagan, Woodland Hills, all of Calif.

[73] Assignee: Rockwell International Corporation, El Segundo, Calif.

[21] Appl. No.: 305,033

[22] Filed: Feb. 2, 1989

[51] Int. Cl.$^5$ ............................................. C07C 117/00
[52] U.S. Cl. ..................................................... 552/11
[58] Field of Search ........................................... 552/11

[56] References Cited

U.S. PATENT DOCUMENTS 4,268,450 5/1981 Frankel et al. ....................... 260/349
4,288,262 9/1981 Flanagan et al. ................... 149/19.6

OTHER PUBLICATIONS

Dehmlow, et al.; "Phase Transfer Catalysis", (1980), pp. 79-80, [Verlag Chemie-Weinheim Deerfield Beach, Fla. Basel].

Primary Examiner—Joseph Paul Brust
Attorney, Agent, or Firm—H. Fredrick Hamann; Harry B. Field; David C. Faulkner

[57] ABSTRACT

A method of producing a hydroxy-terminated aliphatic polyether utilizing a specific catalytic interaction to enhance the solubility and resulting reactivity of an azide moiety.

7 Claims, No Drawings

GLYCIDYL AZIDE POLYMER AND METHOD OF PREPARATION

FIELD OF THE INVENTION

This invention pertains to binders and plasticizers for pyrotechnic materials and, more specifically, to energetic binders and plasticizers for solid propellant systems.

DESCRIPTION OF RELATED ART

Solid propellants may be formulated from an oxidizer and fuel together with suitable binders and plasticizers to impart physical integrity. Most highly energetic systems utilize binders and plasticizers containing energetic moieties such as nitro (—NO$_2$), or other groups. In addition to the nitro-containing binders and plasticizers, azido-substituted binders and plasticizers are also utilized because of their ability to impart substantial energy to propellants.

One known azido binder is a hydroxy-terminated aliphatic polyether having directly pendant azidoalkyl groups such as disclosed and claimed in U.S. Pat. No. 4,268,450. The present invention, while contemplating the production of a polyether having a general structural formula such as described in U.S. Pat. No. 4,268,450, utilizes select reactants in preparing glycidyl azide polymers at a substantially improved rate of production.

SUMMARY OF THE INVENTION

Accordingly, there is provided by the present invention a family of compounds having the general formula

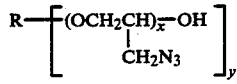

wherein x is an integer having a value of from about 10 to about 60, y is an integer having a value from 1 to about 4, and R is the hydroxy-free residue of a monohydric alcohol, diol, triol, or polyol initiator. The novel method for production is hereinafter set out in greater detail.

OBJECTS OF THE INVENTION

It is an object of the present invention to provide a new method of glycidyl azide polymer production.

It is yet another object of the invention to provide an improved method of polymer production wherein the rate of reaction of the polyepichlorohydrin precursor with an azide ion in a solvent is enhanced utilizing select catalysts.

These and other objects of the present invention will be apparent from the following description of the preferred embodiment.

DESCRIPTION OF THE PREFERRED EMBODIMENT

In accordance with the present invention there is provided a hydroxy-terminated aliphatic polyether having pendant azidoalkyl groups. These hydroxy-terminated aliphatic polyethers synthesized in accordance with the present invention have the following generic or general structural formula

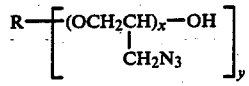

wherein x is an integer having a value of from about 10 to about 60, R is the hydroxy-free residue of a monohydric alcohol, diol, triol, or polyol initiator, and y is an integer having a value of 1 to about 4 indicative of the number of hydroxy groups present in the initiator. For example and without limitation, R may be CH$_2$CH$_2$, CH$_2$CHCH$_2$ and C(CH$_2$)$_4$ from HOCH$_2$CH$_2$OH, HOCH$_2$CHOHCH$_2$OH and C(CH$_2$OH)$_4$, respectively, which are representative of initiator residues which provide multifunctional azidoalkyl polymeric ethers.

The glycidyl azide polymer (GAP) may be produced in a solution of dimethylsulfoxide (DMSO) from the azide ion, and polyepichlorohydrin (PECH), which is prepared by polymerization of epichlorohydrin (ECH) using ethylene glycol or other polyol initiator and boron trifluoride catalyst.

A representative hydroxy-terminated aliphatic polyether, for example, a glycidyl azide diol, is prepared from a diol polyepichlorohydrin (PECH) in accordance with the present invention as follows:

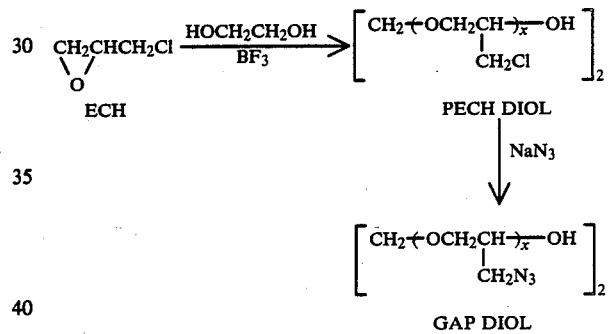

where x is an integer having a value of from about 10 to 60.

GAP triol, GAP tetraol, and GAP polyols would be prepared in analogous manner using triol, tetraol and polyol initiators in the epichlorohydrin polymerization step.

The rate of synthesis of said glycidyl azide polymers may be enhanced by utilizing a heretofore unknown catalytic interaction to enhance the solubility of the azide in DMSO. The azide reacts at a more rapid rate with the polyepichlorohydrin due to the presence of the catalyst to yield the desired polymer. The catalysts useful for increasing the rate of reaction of PECH and NaN$_3$ are salts selected from the chlorides and bromides of quaternary ammonium and lithium cations. The catalysts or reactants preferred for the present substitution reaction include methyltrioctylammonium chloride, dodecyltrimethylammonium chloride, lithium chloride, and lithium bromide. It has been found that these catalytic agents undergo metathesis with sodium azide to produce an azide which is more soluble than NaN$_3$ in the DMSO reaction mixture. The consequence of the higher concentration of azide ion so produced is to increase the reaction rate.

Solvents other than DMSO can be used for the reaction medium provided that they are good solvents for both PECH and azide ion. For example, solvents such as dimethylformamide (DMF), dimethylacetamide (DMAC), ethylene glycol, and hexamethylphosphorotriamide (HMPTA) have been used and the rates of reaction for conversion of PECH to GAP in a given solvent are increased in the presence of the said catalysts.

By way of example and not limitation, the improved synthesis according to the present invention may best be understood by the following examles.

EXAMPLE 1

Reaction Using Methyltrioctylammonium Chloride

To a stirred slurry of 37.25 g (0.573 mol) NaN$_3$ in 25 g DMSO was added 7.5 g (0.0186 mol) methyltrioctylammonium chloride catalyst and the mixture was heated to 100° C. A separate solution of 50 g (0.546 equivalents) PECH diol in 25 g DMSO was also heated to 100° C. prior to its rapid addition to the NaN$_3$/catalyst mixture. The resulting reaction mixture slurry was maintained at 100° C. and periodically 5 ml aliquots were withdrawn to determine the extent of reaction. The aliquots were washed sequentially with 4×40 ml H$_2$O and 3×4 ml (CH$_3$)$_2$CHOH and then transferred with the aid of 5 ml tetrahydrofuran (THF) to a rotary vacuum evaporator where all volatile solvents were removed. From the infrared spectrum of each of the aliquots the fraction of PECH remaining was determined (from the ratio of the intensities of the C—Cl/C—H bands at 2875 cm$^{-1}$ and 747 cm$^{-1}$, respectively) by comparison with a calibration curve obtained from known mixtures of the same PECH diol and the GAP prepared from it. A plot of the logorithm of the ratio of PECH concentration over initial PECH concentration as a function of reaction time yields a straight line the slope of which is the rate constant for the reaction (See Table 1). Because of the exothermic nature of the substitution reaction, the procedure can be modified slightly to permit facile management of the heat released. The modification consists of adding the PECH/DMSO mixture more gradually to the NaN$_3$/catalyst/DMSO mixture such that the reaction temperature is maintained at ±5° C. of the reaction temperature of about 100° C.

EXAMPLE 2

Lithium Chloride

The experimental procedure and the quantities of reactants used were identical to those in Example 1 except that the catalyst LiCl (0.80 g, 0.0189 mol) was substituted for the methyltrioctylammonium chloride. The reaction rate constant obtained is shown in Table 1.

As shown in Table 1 below, the effect of the NaN$_3$/catalyst mol ratio on the reaction rate is indicated.

TABLE 1

| Psuedo First Order Rate Constants at 100° C. | | |
|---|---|---|
| Catalyst | NaN$_3$/Catalyst | K$^{-hr}$ |
| Control (no catalyst) | ∞ | 0.659 |
| Methyltrioctylammonium chloride | 30.8 | 1.178 |
| Lithium chloride | 30.3 | 0.928 |

TABLE 1-continued

| Psuedo First Order Rate Constants at 100° C. | | |
|---|---|---|
| Catalyst | NaN$_3$/Catalyst | K$^{-hr}$ |
| Lithium chloride | 10.0 | 1.587 |

From Table 1, it is noted that the reaction rate is substantially accelerated in the nucelophilic substitution reaction wherein the presence of methyltrioctylammonium chloride (78.8 percent) or lithium chloride (40.8 percent) at a N$_3^-$/additive mole ratio of approximately 30. The substitution reaction is further accelerated (increase of 141 percent) with lithium chloride when the N$_3^-$/additive ratio is decreased to about 10.

Obviously, numerous variations and modifications may be made without departing from the present invention. Accordingly, it should be clearly understood that the form of the present invention described above is illustrative only and is not intended to limit the scope of this present invention.

What is claimed is:

1. A method of producing hydroxy-terminated aliphatic polyether having pendant azidoalkyl group and having the following general structural formula

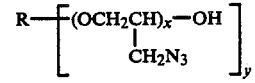

wherein x is an integer from about 10 to about 60, R is the hydroxy-free residue of a monohydric alcohol, diol, triol, or tetraol, and y is an integer from 1 to 4, and said method comprises:
   (a) preparing a NaN$_3$, catalyst and solent mixture, wherein said catalyst is selected from the group consisting of methyltrioctyl ammonium chloride, dodecyltrimethyl ammonium chloride, lithium chloride, lithium bromide, NH$_4$Cl, and NH$_4$Br;
   (b) introducing a mixture of polyepichlorohydrin and DMSO into said mixture of step (a); and
   (c) reacting the mixture of steps (a) and (b) to produce said aliphatic polyether.

2. The method of claim 1 wherein the NaN$_3$, catalyst and solvent mixture is initially heated to 100° C.

3. The method of claim 1 wherein the mixture of step (b) is heated to 100° C. prior to the addition thereof to the mixture of step (a).

4. The method of claim 1 wherein the polyepichlorohydrin and DMSO mixture is added to the NaN$_3$, catalyst and solvent mixture such that the reaction temperature is maintained at ±5° C. of the reaction temperature of about 100° C.

5. The method of claim 1 wherein said catalyst is selected from the group consisting of methyltrioctylammoniom chloride, dodecyltrimethylammonium chloride, lithium chloride and lithium bromide.

6. The method of claim 1 wherein said catalyst is selected from the group consisting of salts selected from the chlorides and bromides of quaternary ammonium and lithium cations.

7. The method of claim 1 where said solvent is selected from the group consisting of DMSO, dimethylformamide, dimethylacetamide, ethylene glycol and hexamethylphosphorotriamide.

* * * * *

UNITED STATES PATENT AND TRADEMARK OFFICE
CERTIFICATE OF CORRECTION

PATENT NO. : 4,937,361
DATED : June 26, 1990
INVENTOR(S) : Wagner et al.

It is certified that error appears in the above-identified patent and that said Letters Patent is hereby corrected as shown below:

Column 3, Line 10, the word "examles" should be --examples--.

Column 4, Claim 1., Line 22, the article "a" should be inserted between the words "producing" and "hydroxy-terminated".

Column 4, Claim 1., Line 35, the word "solent" should be --solvent--.

Signed and Sealed this

Fourteenth Day of May, 1991

*Attest:*

HARRY F. MANBECK, JR.

*Attesting Officer*     *Commissioner of Patents and Trademarks*